Jan. 3, 1950

C. J. HAHN 2,493,402

CONNECTION BETWEEN SHAFTS
AND SHAFT MOUNTED MEMBERS

Filed April 9, 1947

Inventor
C. J. HAHN

By Rob Newyn
Attorney

Jan. 3, 1950

C. J. HAHN 2,493,402

CONNECTION BETWEEN SHAFTS AND SHAFT MOUNTED MEMBERS

Filed April 9, 1947

C. J. HAHN
INVENTOR.

BY *Robt Meyer*
*attorney*

Patented Jan. 3, 1950

2,493,402

UNITED STATES PATENT OFFICE 2,493,402

CONNECTION BETWEEN SHAFTS AND SHAFT MOUNTED MEMBERS

Clarence J. Hahn, Buffalo, N. Y., assignor to Worthington Pump and Machinery Corporation, Harrison, N. J., a corporation of Delaware Application April 9, 1947, Serial No. 740,284

8 Claims. (Cl. 287—53)

1

This invention relates to means for connecting shaft mounted members to power transmitting shafts and, in particular, to improvements in the demountable type of connection wherein a split, tapered adapter hub member acts as an annular wedge to fix the member on the shaft.

One object of this invention is to reduce the pitch diameter of the shaft mounted member and thereby lessen overhang and weight on the shaft bearings as well as increase transmission ratios.

A second object is to positively prevent axial creeping of the hub and member on the shaft.

A further object is to provide an adapter hub which may be shortened to accommodate narrower members or shorter shafts without affecting the tapered engaging surface thereof.

An additional object is to provide a connection for stub power shafts which will transmit heavy loads and yet be easily assembled and disassembled.

Another object is to provide an improved back-off means.

With these and other objects in view, as may appear from the accompanying specifications, the invention consists of various features of construction and combination of parts, which will be first described in connection with the accompanying drawings, showing a connection between shafts and shaft mounted members of a preferred form embodying the invention, and the features forming the invention will be specifically pointed out in the claims.

In the instant description and drawings, the present invention is shown as applied to a V-belt sheave. It is to be understood, however, that it is not so limited but may be applied to other shaft mounted elements such as gears, pulleys, sprockets, etc.

Figure 1:
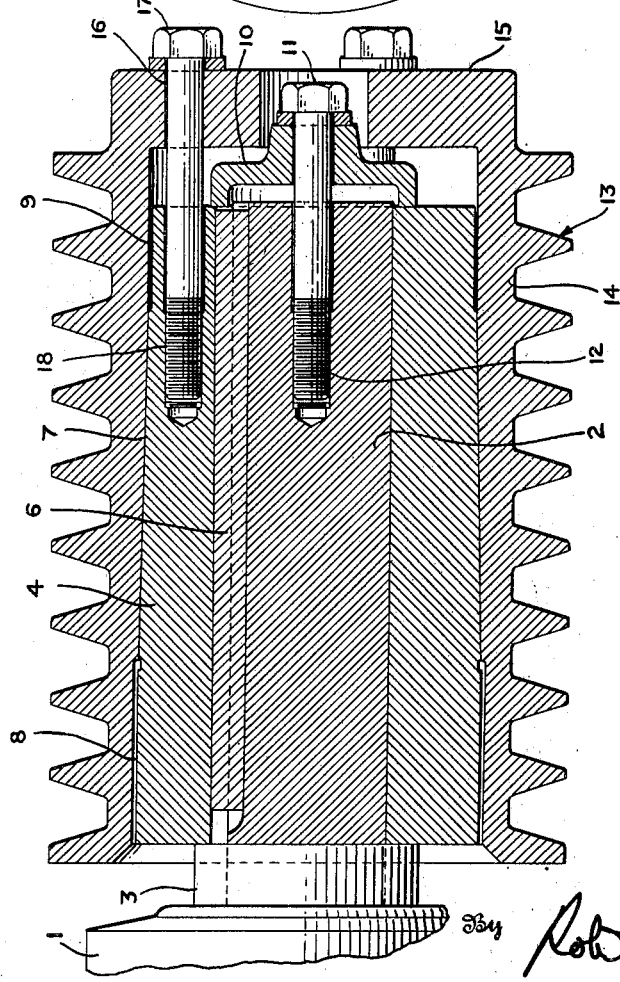
Figure 1 is a longitudinal section through the improved connection.

Figure 1 shows a fragment of a motor 1 or other device in power transfer relationship with a shaft 2. A spacer ring 3 is mounted on the shaft 2 in abutting relationship to the motor 1 and a hub 4. As will become clear hereinafter, the function of the motor 1 and spacer 3 with respect to the connection is to serve as an axially fixed abutment to prevent inward creeping of the hub 4. The tapered hub 4 is keyed to the shaft as shown at 6. The hub 4 is preferably split along its entire axial length, as indicated at 5, so that it will grip the shaft 2 with a uniform pressure when it is compressed by the sheave. The hub has a central portion 7 of its outer surface tapered and is mounted on the shaft 2 so that its large end abuts the spacer sleeve 3. The inner end portion 8 and the outer end portion 9 of the hub are not tapered but are preferably of a uniform diameter to comprise cylindrical surfaces 8 and 9 which may be of the same or slightly smaller diameters than the terminal portions of the tapered area 7 of the hub. It is obvious that the portions 8 and 9 are not suitable for mounting a sheave and can be cut off to accommodate different shaft lengths or different sheave lengths without affecting the magnitude of the tapered sheave contacting area 7.

The dished annular cap 10 provides axial moving or restraining means for the hub 4 and may also be used to prevent longitudinal displacement of the key 6, as shown in Figure 1. The cap 10 has its inner annular edge abutting the outer end of the hub 4 and is prevented from outward axial movement by the bolt 11 which is threaded into a bore 12 in the shaft 2. When the bolt 11 is tightened, the hub will be pressed inwardly against the space ring 3 and will also be prevented from creeping outward.

It is evident from Figure 1 that the sheave 13 is of smaller diameter than the minimum diameter permissible in the usual type of connection. The sheave 13 has no hub portion but has a rim 14 which is contoured internally in the same manner as the outer surface of the hub 4, that is, it has a bore which is centrally tapered and of uniform diameter at one or both of the ends. The sheave bores and tapers are of such diameter that the sheave 13 frictionally engages the tapered surface 7 of the hub 4 and leaves annular gaps adjacent the portions 8 and 9 of the hub. The inner uniform diameter portion of the sheave 13 may thus be removed or cut off to accommodate a shorter shaft 2 without affecting the engagement with hub 4.

The sheave 13 has an inwardly extending annular flange 15 at the outer end which, in the embodiment of Figure 1, is integral with the sheave. The flange 15 has holes 16 for the bolts 17 which thread into holes 18 in the hub whereby the sheave 13 is drawn on the hub and fixed thereto for the transmission of torque or rotary motion.

Two tapped holes 19 in the flange 15 provide means for backing the sheave 13 off the hub 4, Bolts (not shown) threadably engaging the holes 19 will abut the outer end of the hub 4 to axially move the sheave 13 outwardly with respect to the hub.

Figure 3:
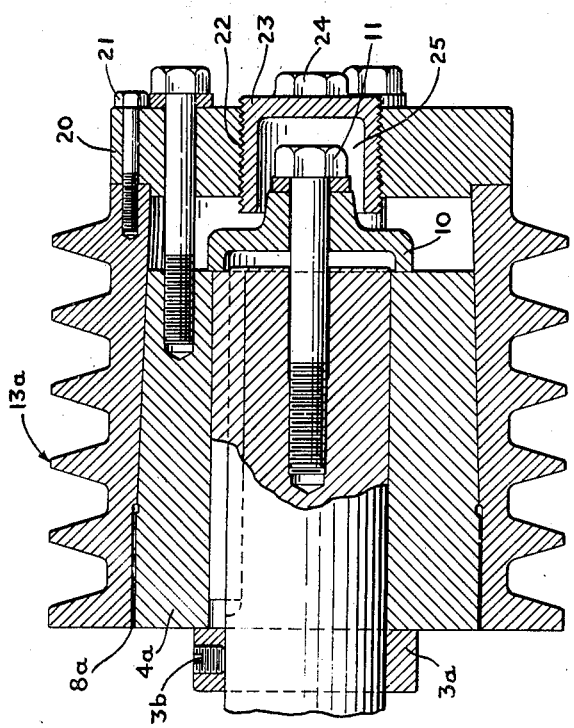
Figure 3 is a longitudinal section of a different form of the invention.

In the embodiment of Figure 3, the hub 4a has a uniform diameter at its large end only and the bore of the sheave 13a is similarly machined to leave a gap 8a. Abutment means are provided by the collar or ring 3a which is axially fixed to the shaft by means of a screw 3b. Instead of an integral flange, the sheave 13a has a flange plate 20 bolted to its rim as shown at 21, the flange plate 20 being bolted to the hub 4a as before.

Figure 2:
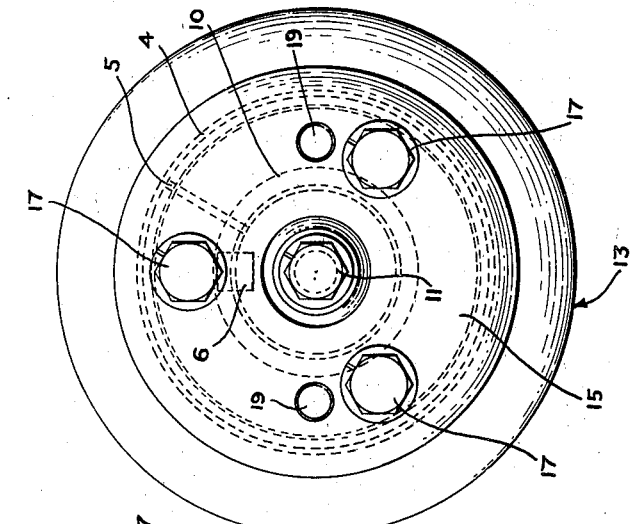
Figure 2 is an end view taken at the right of Figure 1.

The back-off means of the embodiment of Figure 3 differs from that of Figures 1 and 2. Instead of the holes 19, the flange 20 has a threaded bore 22 in alignment with the ends of the shaft. A back-off plug 23 having a hollow portion 25 engages the bore 22 and fits over the cap 10 and bolt 11. The outer end of the plug 23 is suitably adapted, as by the hex head 24, to receive torque. When it is axially forced against the cap 10, it will back-off the flange 20 and sheave 13a. It is obvious that this back-off arrangement could also be used in the integral flange of Figure 1.

Figure 4:
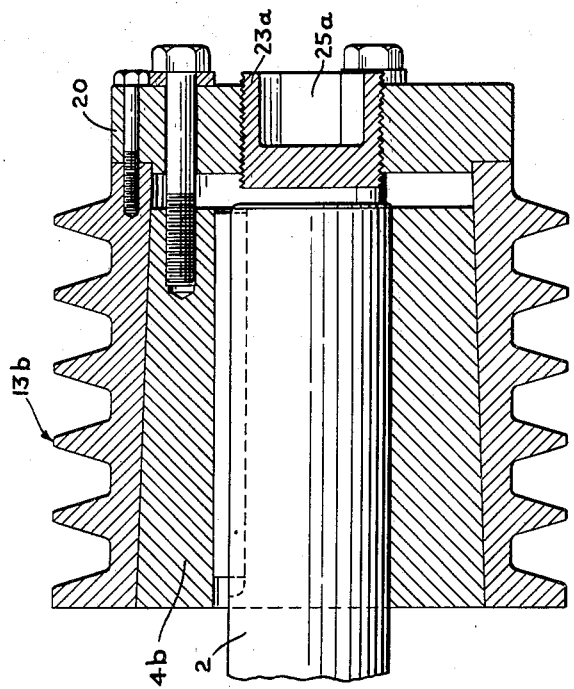
Figure 4 is a longitudinal section of another form of the invention.

In the embodiment of Figure 4, the hub 4b is tapered over its entire length so that there is no gap between it and the sheave 13b. The flange plate 20 attaches the sheave 13b to the hub 4b as before. There is no cap 10 to prevent axial movement of the hub 4b, consequently, the back-off plug 23a contacts the stub end of the shaft 2. Back-off plug 23a has a hollow socket portion 25a which is disposed outwardly and adapted to receive an Allen wrench (not shown). It is apparent that the features of both back-off plugs, i. e., hex head 24 and hex socket 25a, could be combined in one plug which could then be used in both embodiments of the invention.

It will be understood that the invention includes such modifications as fall within the scope of the claims and that it is not limited to the specific construction and arrangement of parts shown.

What is claimed is:

1. In a connection for mounting a member on the outer end portion of a shaft having a threaded bore at said outer end, the combination of a tapered hub keyed to the shaft, a shaft mounted member seated on said hub, means positively connecting said member to said hub, abutment means mounted on the shaft abutting the inner end of said hub and fixed against axial movement in at least the inward direction, a cap fitting over the outer end of the shaft abutting the outer end of said hub, a bolt threadably engaged in said threaded bore at the outer end of the shaft and operatively connected to said cap so that axial forces in said bolt will be transmitted to said cap to force said hub toward said abutment means.

2. In a connection for mounting a member on a shaft, the combination of a hub mounted on the shaft, said hub having the central portion of its outer surface tapered and at least one end portion of uniform diameter and a shaft mounted member having a bore which is tapered in its central portion and of uniform diameter in at least one end portion, the tapered portion of said member bore being substantially similiar to the tapered surface of said hub whereby said member is mounted upon and frictionally engages said hub, the relative diameters of the end portions of said hub surface and member bore being such as to provide at least one annular gap between said hub surface and said member bore, means for connecting said member to said hub, said shaft mounted member provided with means to receive a back-off member for forcing said shaft member off said hub.

3. In a connection for mounting a member on a shaft, the combination of a hub mounted on said shaft, said hub having the central portion of its outer surface tapered and at least one end portion with a surface discontinuous with said tapered surface, and a shaft mounted member having a bore which is tapered in its central portion, at least one end portion of said bore having a surface discontinuous with the tapered portion of said bore, the tapered portion of said member bore being substantially similar to the tapered surface of said hub whereby said member is mounted upon and frictionally engages said hub, the relative diameters of the end portions of said hub surface and member bore being such as to provide at least one annular gap between said hub surface and said member bore, and threaded means for connecting said member to said hub.

4. In a connection between a shaft and a shaft mounted member, the combination of, a tapered hub on said shaft, a shaft mounted member seated on said hub and having a tapered bore for fitting said tapered hub, a flange carried by said shaft mounted member at its end having the smaller diameter bore, means connecting said flange to said tapered hub for forcing said shaft mounted member tightly upon said hub, said flange provided with means to receive a back-off member for positively forcing said shaft mounted member off said hub.

5. In a connection between a shaft and a shaft mounted member, the combination of, a tapered hub on said shaft, a shaft mounted member seated on said hub and having a tapered bore for fitting said tapered hub, a flange carried by said shaft mounted member at its end having the smaller diameter bore, bolts extending through said flange and into said tapered hub for forcing said shaft mounted member tightly upon said tapered hub, said flange provided with a threaded opening to receive a back-off member for forcing said shaft mounted member off said hub.

6. In a connection between a shaft and a shaft mounted member, the combination of, a split hub mounted on the shaft, said hub having at least the central portion of its outer surface tapered, a shaft mounted member having a tapered bore and adapted to be mounted on the tapered portion of said hub, a flange carried by said shaft mounted member at its end having the smaller diameter bore, means connecting said flange to said hub, said flange provided with means to receive a back-off member for forcing said shaft mounted member off said hub.

7. In a connection for mounting a member on the end portion of a shaft having a threaded bore at one end of said shaft, the combination of, a tapered hub keyed to the shaft, a shaft mounted member seated on said hub and provided with a tapered bore, a flange carried by said shaft mounted member at its end having the smaller diameter bore, means connecting said flange to said hub for forcing said shaft mounted member tightly upon said tapered hub, said flange provided with means to receive a back-off member for forcing said shaft mounted member off said hub, and means coacting with said threaded bore to fix said tapered hub and prevent axial movement thereof along the shaft.

8. In a connection for mounting a member on the end portion of a shaft having a threaded bore at the end of said shaft, the combination of, a tapered hub keyed to the shaft, a shaft mounted member seated on said hub and having a tapered bore, a flange carried by said shaft mounted member at the small diameter end of said member, means connecting said flange to said hub for forcing said shaft mounted member tightly upon said tapered hub, said flange provided with a threaded opening to receive a back-off member for forcing said shaft mounted member off said hub, a spacer abutting the inner end of said hub, a cap abutting the outer end of said hub, a bolt operatively connected to said cap and engaging in said threaded bore, said cap abutting the outer end of said hub and coacting with the spacer to prevent axial movement of said hub along said shaft.

CLARENCE J. HAHN.

REFERENCES CITED

The following references are of record in the file of this patent:

UNITED STATES PATENTS

| Number | Name | Date |
|---|---|---|
| 165,546 | Cook | July 13, 1875 |
| 756,503 | Johnston | Apr. 5, 1904 |
| 905,019 | Swanson | Nov. 24, 1908 |
| 1,065,069 | Noble | June 17, 1913 |
| 1,279,318 | Friddle | Sept. 17, 1918 |
| 1,416,578 | Sauers | May 16, 1922 |
| 2,396,414 | Firth | Mar. 12, 1946 |
| 2,407,032 | Myers | Sept. 3, 1946 |

FOREIGN PATENTS

| Number | Country | Date |
|---|---|---|
| 678,406 | France | Mar. 24, 1930 |